(12) United States Patent
Durot et al.

(10) Patent No.: US 11,332,181 B2
(45) Date of Patent: May 17, 2022

(54) LENGTH-ADJUSTABLE STEERING SHAFT FOR A MOTOR VEHICLE, AND PROFILED SLEEVE FOR A STEERING SHAFT

(71) Applicants: THYSSENKRUPP PRESTA AG, Eschen (LI); thyssenkrupp AG, Essen (DE)

(72) Inventors: Janick Durot, Widnau (CH); Marius Breuer, Rochester Hills, MI (US)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 241 days.

(21) Appl. No.: 16/481,723

(22) PCT Filed: Jan. 23, 2018

(86) PCT No.: PCT/EP2018/051542
§ 371 (c)(1),
(2) Date: Jul. 29, 2019

(87) PCT Pub. No.: WO2018/141580
PCT Pub. Date: Aug. 9, 2018

(65) Prior Publication Data
US 2019/0389502 A1     Dec. 26, 2019

(30) Foreign Application Priority Data

Feb. 2, 2017   (DE) .................... 10 2017 201 709.0

(51) Int. Cl.
  *B62D 1/20*  (2006.01)
  *F16C 3/03*  (2006.01)
  *F16D 3/06*  (2006.01)
(52) U.S. Cl.
  CPC ................. *B62D 1/20* (2013.01); *F16C 3/03* (2013.01); *F16D 3/06* (2013.01);
  (Continued)

(58) Field of Classification Search
  CPC ..... B62D 1/20; F16D 3/06; F16C 3/03; Y10T 403/4924; Y10T 403/7033; Y10T 403/32475
  (Continued)

(56) References Cited

U.S. PATENT DOCUMENTS 3,703,105 A * 11/1972 Milton ................... B62D 1/192
5,383,811 A    1/1995 Campbell
(Continued)

FOREIGN PATENT DOCUMENTS

CN     102906431 A     1/2013
CN     103282682 A     9/2013
(Continued)

OTHER PUBLICATIONS

English Translation of International Search Report issued in PCT/EP2018/051542, dated Apr. 12, 2018.

*Primary Examiner* — Greg Binda
(74) *Attorney, Agent, or Firm* — thyssenkrupp North America, LLC (57) ABSTRACT

A longitudinally adjustable steering shaft for a vehicle has an inner shaft received in an outer shaft to be displaceable coaxially and in the direction of a rotational axis. The two shafts have interlocking profiles in cross section for transmitting torques. A profile sleeve on which the outer shaft is telescopically arranged is arranged on the inner shaft part. The profile sleeve in a first end region surrounds a free end of the inner shaft part in the mounted state and has a radially inwardly protruding stop for abutment against an end face of the inner shaft in one axial direction and an end region of the inner shaft has a radially outwardly protruding projection for abutment of the profile sleeve in an opposite axial direction.

(Continued)

The profile sleeve includes a radially inwardly protruding stop with reference to a simplified mounting in a first end region.

13 Claims, 5 Drawing Sheets

(52) U.S. Cl.
CPC .. *Y10T 403/32475* (2015.01); *Y10T 403/4924* (2015.01); *Y10T 403/7033* (2015.01)

(58) Field of Classification Search
USPC ......................................................... 464/162
See application file for complete search history.

(56) References Cited

U.S. PATENT DOCUMENTS

| | | | | |
|---|---|---|---|---|
| 8,714,048 | B2* | 5/2014 | Schnitzer | ............... B62D 1/185 |
| 9,028,164 | B2* | 5/2015 | Yablochnikov | ........... F16D 3/06 |
| | | | | 403/359.1 |
| 10,197,090 | B2* | 2/2019 | Daenzer | ................ F16C 29/123 |
| 10,520,010 | B2* | 12/2019 | Grawenhof | ............... F16C 3/03 |
| 11,092,190 | B2* | 8/2021 | Mark | ........................ F16D 3/06 |
| 2013/0079165 | A1 | 3/2013 | Fevre | |
| 2014/0018177 | A1 | 1/2014 | Drechsler | |
| 2014/0200086 | A1 | 7/2014 | Kurokawa | |
| 2019/0176871 | A1* | 6/2019 | Breuer | ..................... F16D 3/06 |

FOREIGN PATENT DOCUMENTS

| | | |
|---|---|---|
| CN | 103459871 A | 12/2013 |
| DE | 202010017747 U | 7/2012 |
| EP | 0755843 A | 1/1997 |
| EP | 1731400 A | 12/2006 |
| EP | 1759955 A | 3/2007 |
| FR | 2964355 A | 3/2012 |
| GB | 2429761 A | 3/2007 |
| JP | 200354422 A | 2/2003 |
| JP | 2003306152 A | 10/2003 |

* cited by examiner

LENGTH-ADJUSTABLE STEERING SHAFT FOR A MOTOR VEHICLE, AND PROFILED SLEEVE FOR A STEERING SHAFT

CROSS REFERENCE TO RELATED APPLICATIONS

This application is a U.S. National Stage Entry of International Patent Application Serial Number PCT/EP2018/051542, filed Jan. 23, 2018, which claims priority to German Patent Application No. DE 10 2017 201 709.0, filed Feb. 2, 2017, the entire contents of both of which are incorporated herein by reference.

FIELD

The present disclosure generally relates to a longitudinally adjustable steering shaft for a motor vehicle.

BACKGROUND

DE 20 2010 017 747U1 discloses such a longitudinally adjustable steering shaft for a motor vehicle. In order to prevent the profile sleeve slipping on the inner shaft part in the axial direction, the inner shaft part is provided with two radially projecting latching lugs which are arranged on both sides of the profile sleeve and fix said profile sleeve. A disadvantage of said solution is that two latching lugs are necessary in order to secure the profile sleeve on the inner shaft part in the axial direction, and that on account of the different thermal expansion coefficients of the profile sleeve and of the inner shaft part, force conditions and consequently disadvantageous deformation of the profile sleeve occur.

Thus a need exists for a steering shaft with improved fixing of the profile sleeve.

SUMMARY

The invention relates to a longitudinally adjustable steering shaft for a motor vehicle, having an inner shaft part which is received coaxially in an outer shaft part so as to be displaceable in an axial direction of the steering shaft, wherein the two shaft parts comprise profiles which interlock in cross section for transmitting a torque and a profile sleeve is arranged between the inner shaft part and the outer shaft part. The invention also relates to a profile sleeve for the named steering shaft.

In the case of the steering shaft according to the invention, the profile sleeve comprises in a first end region at least one radially protruding stop for abutment against an end face of the inner shaft part or of the outer shaft part in the one axial direction and a radial projection is provided on the profile sleeve or on one of the two shaft parts for abutment of the profile sleeve against the inner shaft part or the outer shaft part in the opposite axial direction.

The radial projection can be provided according to the invention on the profile sleeve or on the inner shaft part or the outer shaft part, the projection preventing the displacement of the profile sleeve in the opposite axial direction. If the projection is provided on the profile sleeve, said projection then engages in an opening of the inner shaft part or of the outer shaft part such that there is a positive locking abutment of the profile sleeve against the inner shaft part or the outer shaft part and a displacement of the profile sleeve in the opposite axial direction is prevented.

As an alternative to this, the inner shaft part or the outer shaft part is provided with the radial projection. Consequently, an end region of the inner shaft part or of the outer shaft part is provided in a preferred manner with the radial projection for the abutment of the profile sleeve in the opposite axial direction.

In the case of the steering shaft according to the invention, where the profile sleeve is arranged on the inner shaft part, the profile sleeve comprises in a first end region, which surrounds a free end of the inner shaft part in the mounted state, at least one radially inwardly protruding stop for abutment against an end face of the inner shaft part in the one axial direction, and an end region of the inner shaft part is provided with a radially outwardly protruding projection for the abutment of the profile sleeve in the opposite axial direction.

In the case of the alternative steering shaft according to the invention where the profile sleeve is received fixedly in the outer shaft part, the profile sleeve comprises in a first end region at least one radially outwardly protruding stop for abutment against an end face of the outer shaft part in the one axial direction, and an end region of the outer shaft part is provided with a radially inwardly protruding projection for abutment of the profile sleeve in the opposite axial direction.

On account of the radially protruding stop, the profile sleeve can only be pushed so far in the one axial direction onto the inner shaft part or pushed into the outer shaft part until the free end thereof reaches the first end region of the profile sleeve and there the axial movement is stopped as a result of the stop. So that the profile sleeve is not able to be pulled in opposition to the slip-on direction in the opposite axial direction from the internal shaft part or pulled out of the interior of the outer shaft part, after the slipping-on or slipping-in of the profile sleeve, the end region of the inner shaft part or of the outer shaft part is provided with a radially outwardly or inwardly protruding projection, against which the profile sleeve lies in the opposite axial direction so that it is not able to be removed. As a result of the measures according to the invention, the profile sleeve is therefore fixed on the inner shaft part or in the outer shaft part in both axial directions, advantageously only one single stop having to be realized on the inner shaft part or on the outer shaft part in contrast to the prior art where two latching lugs are necessary for the axial fixing of the profile sleeve.

As the profile sleeve is only fixed according to the invention in one single axial end region against displacement in both axial directions, the other axial end region remains freely displaceable in the case of thermal expansion or contraction so that advantageously no mechanical stresses, bulges or tilting of the profile sleeve arranged between the inner shaft part and the outer shaft part can arise, blocking the longitudinal displaceability of the outer shaft part on the inner shaft part being advantageously avoided. Another advantage of the one-sided axial fixing of the profile sleeve on the inner shaft part or on the outer shaft part is also that the profile sleeve is able to be produced with considerably greater production tolerances with regard to its axial length, which simplifies the production and reduces the production costs.

Advantageously, the profile sleeve comprises in the named first end region a slot which is open in the axial direction, in which the radial projection of the inner shaft part or of the outer shaft part engages. The radial projection of the inner shaft part or of the outer shaft part can consequently lie against a closed axial side of the slot which is situated opposite the open axial side of the slot. This enables axial displacement of the radial projection at a distance from the end face of the inner shaft part or of the outer shaft part, as a result of which production of the radial projection is made easier, in particular when it is realized according to a further advantageous embodiment of the invention as material throw-up of the inner shaft part or of the outer shaft part.

In a further advantageous design, the projection is introduced as caulking in the axial direction proceeding from the end face of the inner shaft part or of the outer shaft part. Caulking in the axial direction where the projection is pressed out of the material of the inner shaft part or of the outer shaft part and the material deflects radially outward or inward, is more advantageous than caulking which is introduced directly in the radial direction, for, on the one hand, the radial caulking would have to be effected from inside to outside, which is difficult in the case of an inner shaft part which is realized as a closed tube, and on the other hand, radial caulking could result in unwanted deformation of the inner shaft part or of the outer shaft part so that the shaft parts could jam in the case of a telescoping operation. In the case of caulking in the axial direction, the shaft part behaves in a considerably more rigid manner and maintains its other form up to the desired radial projection. Consequently, unwanted deformation of the cross section of the inner shaft part is able to be avoided on account of the radial projection.

A further advantageous design of the invention provides that the profile sleeve is provided with a relief opening in the axial direction next to the inner end of the slot. In the case of the caulking operation named above, the resultant radial projection can also be pressed in the axial direction against the closed axial end of the slot, the profile sleeve being able to be plastically deformed. So that such a plastic deformation cannot result in tensioning the entire profile sleeve with bulges and clamping in relation to the outer shaft part, the relief opening according to the invention is provided. Said relief opening reduces the rigidity of the sleeve material which remains between the relief opening and the closed axial side of the slot and is able to deform in the direction of the relief opening without causing the entire body of the profile sleeve to deform. The sleeve material remaining between the relief opening and the closed axial side of the slot comprises in a preferred manner a width measured in the axial direction of less than 10 mm, in a particularly preferred manner of less than 5 mm.

In an advantageous design the radially inwardly protruding stop is designed as a circumferential collar of the profile sleeve.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Figure 1:
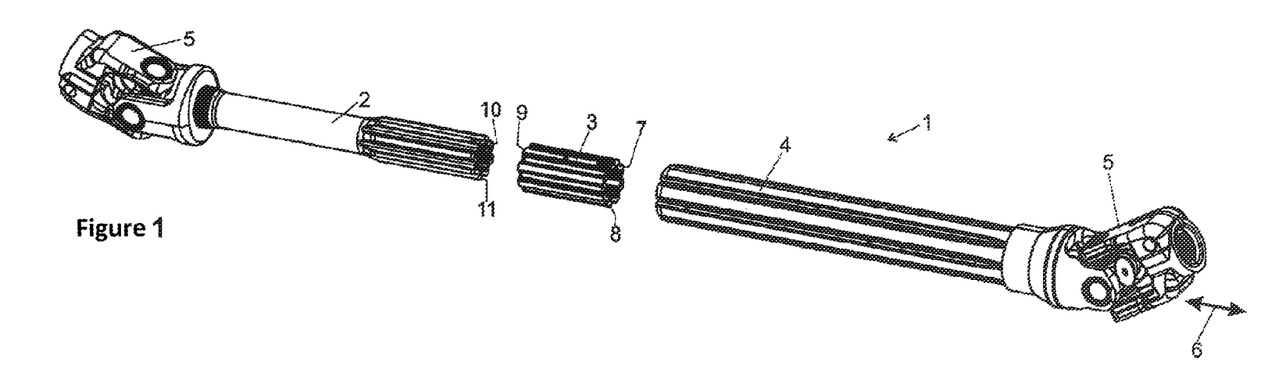
FIG. 1 is a perspective view of a steering shaft assembly, having an inner shaft part, a profile sleeve to be fixed on the inner shaft part and an outer shaft part which can be slipped onto the profile sleeve and the inner shaft part prior to assembly.

FIG. 1 shows a steering shaft 1 according to the invention in the state prior to assembly. Said steering shaft includes an inner shaft part 2, a profile sleeve 3 to be fixed on the inner shaft part 2 and an outer shaft part 4 which, in the mounted state, is pushed over the inner shaft part 2 which is provided with the profile sleeve 3 so that the shaft parts 2, 4 interlock together telescopically in the axial direction 6. The axial direction 6 of the steering shaft 1 corresponds to the direction of the rotational axis.

The inner shaft part 2 and the outer shaft part 4 are each provided on their ends which do not interlock with, in each case, one cardan joint 5, the cardan joints 5 serving for redirecting the rotational movement of the steering shaft 1 and for adapting to the requirements in the motor vehicle. The adjustability in the axial direction 6 also serves for this purpose.

Figure 3:
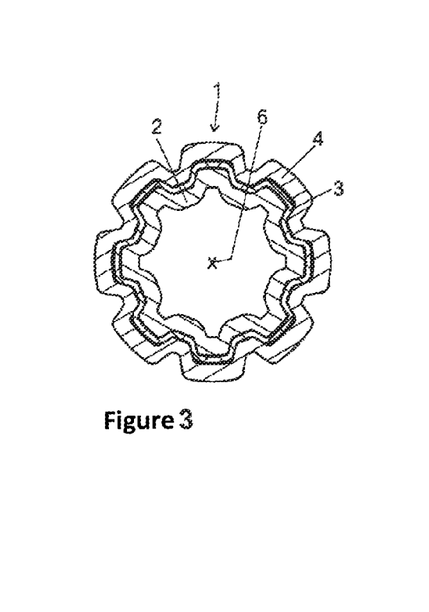
FIG. 3 is a cross-sectional view through a steering shaft.

In order to transmit a torque from one shaft part to the other, the shaft parts 2, 4 have a wavy or jagged profile, an outer profile of the inner steering shaft 2 interlocking in a positive locking manner in the direction of rotation with an inner profile of the outer steering shaft 4. A small wavy cavity, which is closed per se and in which the profile sleeve 3 is arranged, is still provided, however, between the outer profile of the inner shaft part 2 and the inner profile of the outer shaft part 4. The profile sleeve 3 consequently also has a wavy or jagged profile which is adapted on the inside to the outside profile of the inner shaft part 2 and on its outside is adapted to the inner profile of the outer shaft part 4. In other words, the profile sleeve 3 comprises on the inside a cross-sectional profile which corresponds to the outside profile of the inner shaft part 2 and on the outside a cross-sectional profile which corresponds to the inside profile of the outer shaft part 4. It is the object of the profile sleeve 3 to make possible as low-friction as possible a displacement of the outer shaft part 4 in relation to the inner shaft part 2 in the axial direction 6 and, in this case, to transmit torques between the shaft parts 2, 4 in as play-free a manner as possible.

The profile sleeve 3 can consist of metal, plastics material or other materials or material combinations and a lubricant can be provided between its outer surface and the outer shaft part 4 sliding thereon.

In order to fix the profile sleeve 3 on the inner shaft part 2 so that it is not able to slip from the inner shaft part 2 when sliding over the outer shaft part 4 in the axial direction 6, but remains immovably fixed in the axial direction 6 at or on the inner shaft part 2, the measures according to the invention which are described below are provided.

Figure 2:
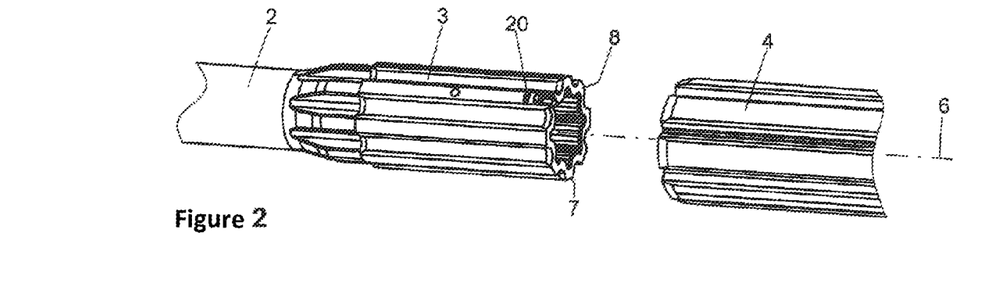
FIG. 2 is an enlarged detailed view of FIG. 1 of the profile sleeve already having been pushed onto the inner shaft part and fixed.
Figure 4:
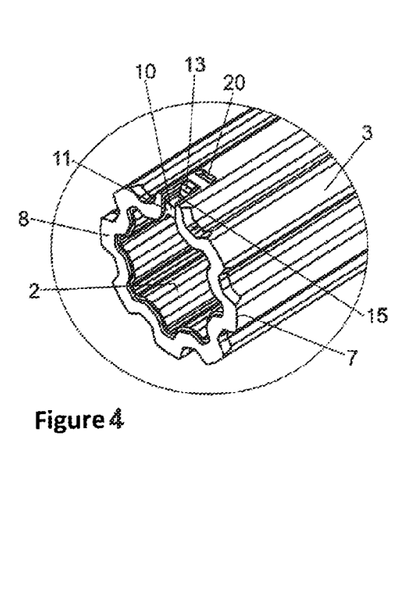
FIG. 4 is a perspective detailed view of an inner shaft part with a profile sleeve mounted thereon.
Figure 5:
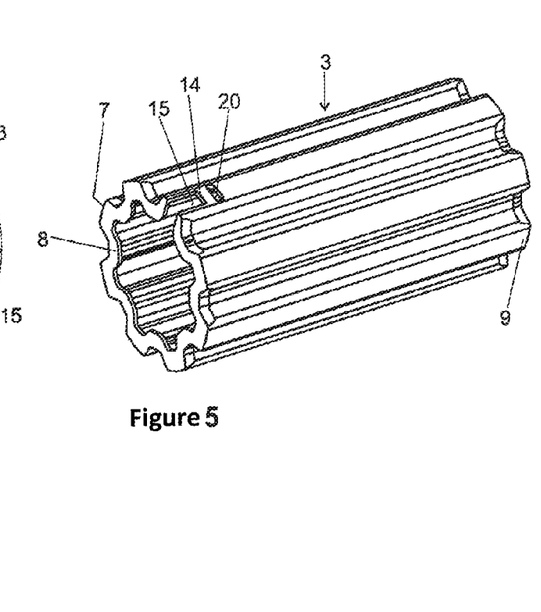
FIG. 5 is a perspective view of a profile sleeve.

The profile sleeve 3 is consequently provided in a first end region 7 with a radially inwardly projecting collar 8 which is realized as a stop and prevents the free passage of the inner shaft part 2. During assembly, the profile sleeve 3 is pushed over the free end 10 of the inner shaft part 2 with its second, open end region 9 to the front. The profile sleeve 3 slides, in this case, over the outer profile of the inner shaft part 2 until the free end 10 of the inner shaft part 2 arrives in the first end region 7 of the profile sleeve 3 and an end face 11 of the inner shaft part 2 knocks against the radially inwardly projecting collar 8 of the profile sleeve 3 in the one axial direction (=slip-on direction). The collar 8 serves here therefore as a stop 8 for delimiting the movement of the profile sleeve 3 in the one axial direction 6 when the profile sleeve 3 is slipped onto the inner shaft part 2.

The profile sleeve 3 is not yet secured in the other axial direction 6, namely in opposition to the slip-on direction, so that it could easily be removed again from the inner shaft part 2. A projection 13 of the inner shaft part 2, which is arranged in an end region 12 of the inner shaft part 2, which also includes the free end 10, and projects radially outward and lies against the profile sleeve 3 in the axial direction 6 which is opposite the slip-on direction, is provided for the fixing in the other axial direction 6. The projection 13 is arranged offset inwardly by a few millimeters in relation to the end face 11 of the inner shaft part 2.

Figure 6:
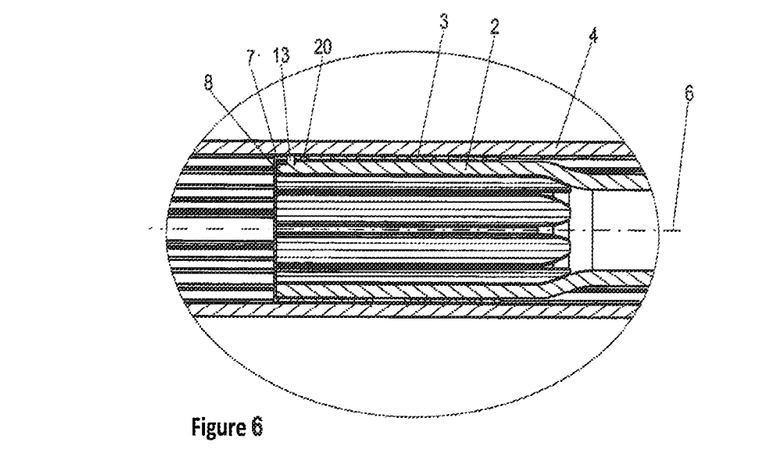
FIG. 6 is a longitudinal sectional view of a part region of the steering shaft in the mounted state.

In order to provide a corresponding axial stop surface 14, the profile sleeve 3 is already provided in its first end region 7 with a slot 15 which extends in the axial direction 6, is open in the axial direction 6 in the first end region 7 of the profile sleeve 3, extends inwardly in the axial direction 6 and ends at the axial stop face 14. The projection 13 of the inner shaft part 2 engages in the slot 15 of the profile sleeve 3 and lies against the axial stop surface 14 in a positive-locking manner so that the profile sleeve 3 is not able to be removed from the inner shaft part 2 in opposition to the slip-on direction and is finally fixed on the inner shaft part 2 in both axial directions 6.

Figure 7:
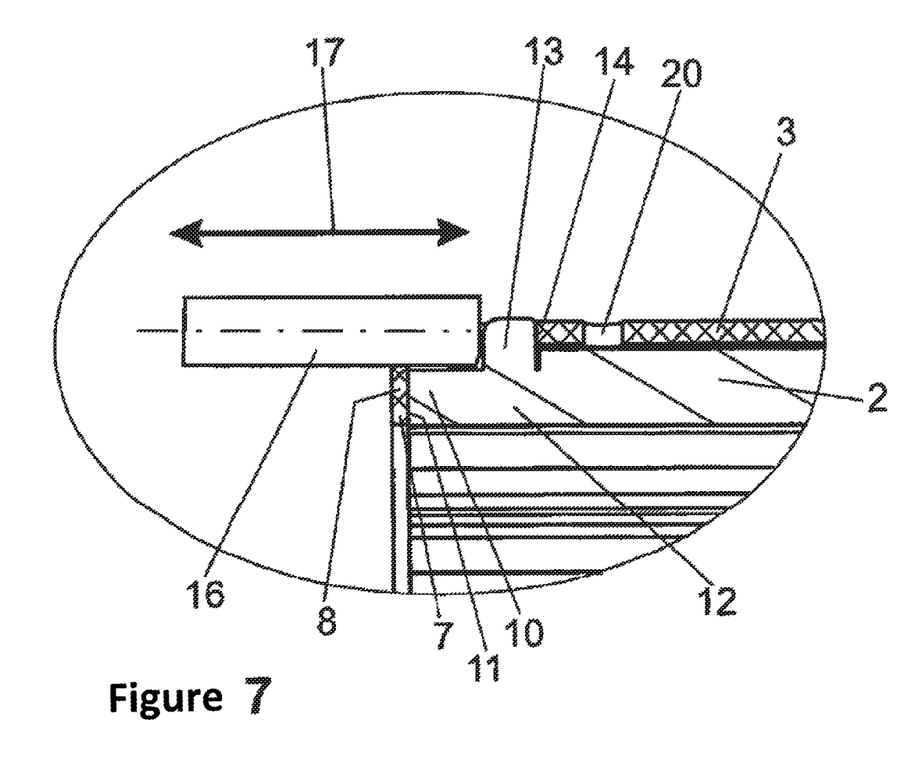
FIG. 7 is a sectional view of the enlarged part region of the inner shaft part with a profile sleeve during a caulking operation for fixing the profile sleeve on the inner shaft part.
Figure 8:
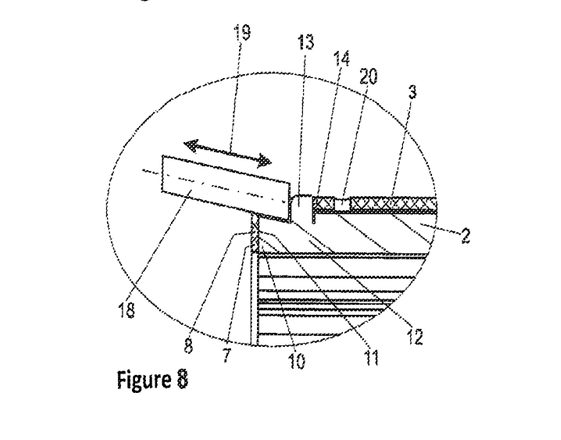
FIG. 8 is a sectional view of an inner shaft part with a profile sleeve similar to FIG. 7 but with an alternative caulking operation.

FIGS. 7 and 8 show two different methods for forming the projection 13 once the profile sleeve 3 has been slipped-on during the assembly of the steering shaft 1 according to the invention. The radial projection 3 is generated as a result of material throw-up of the inner shaft part 2. In the present exemplary embodiment, the projection 13 is introduced as caulking in the axial direction 6 proceeding from the end face 11 of the inner shaft part 2. FIG. 7 shows a caulking tool 16, which is moved in the caulking direction 17, which corresponds to the axial direction 6. Despite the caulking direction 17 lying in the axial direction 6, the material of the inner shaft part 2 is ejected radially outward so that a radial projection 13 is created. The material of the inner shaft part 2 only being ejected outwardly and not inwardly is because the caulking tool 16 only detects and deforms a radially outer edge region of the inner shaft part 2. A considerably stronger wall region of the inner shaft part 2 which is located radially further inside also remains non-deformed in the region of the projection 13.

FIG. 8 shows a somewhat modified alternative caulking operation where a modified caulking tool 18 is moved in a modified caulking direction 19 which deviates slightly from the axial direction 6. The caulking direction 19 is arranged at an angle to the axial direction 6, in a preferred manner the angle between the caulking direction 19 and the axial direction is less than 30°.

In order not to generate any deformation or tensioning in the profile sleeve 3 by the caulking operation, the profile sleeve 3 is provided with a relief opening 20 which is mounted with the axial stop surface 14 behind the inner end of the slot 15 in the axial direction 6. The relief opening 20 is only at a slight distance from the axial stop surface 14 of the slot 13 so that the material of the profile sleeve 3 remaining between the axial stop surface 14 and the relief opening 20 is easily deformable. If the projection 13 is generated during the above-mentioned caulking operation, the resulting projection 13 is pressed against the axial stop surface 14 of the profile sleeve 3 at the end of the caulking operation. In this case, the material of the profile sleeve 3 is able to deform in particular in the axial direction 6. The relief opening 20 ensures that the named deformation extends, proceeding from the axial stop surface 14, into the relief opening 20 and the material of the profile sleeve 3 surrounding the relief opening 20 cannot be deformed further or put under tension. It is ensured in this way that in the subsequent operation of the steering shaft 1 according to the invention the outer shaft part 4 is displaceable in an unobstructed manner in the axial direction 6 along the profile sleeve 3.

Figure 9:
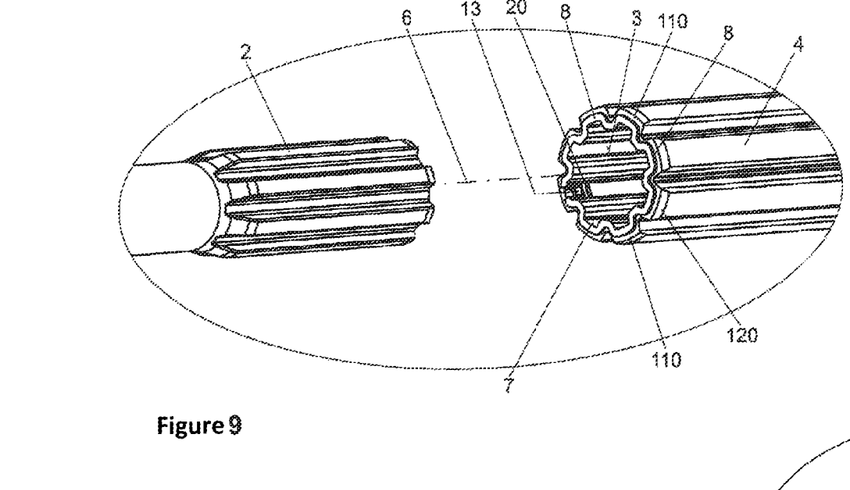
FIG. 9 is a detailed view of a steering shaft which has been partially pulled apart in a further embodiment, the profile sleeve having been inserted and fixed in the outer shaft portion.

FIG. 9 shows a view of a detail of a steering shaft 1 that has been partially pulled apart in a further embodiment, the profile sleeve 3 being inserted and fixed in the outer shaft part 4. The profile sleeve 3 is consequently provided in a first end region 7 with a radially outwardly projecting collar 8, which is realized as a stop and prevents the free passage of the profile sleeve 3 into the outer shaft part 4. At assembly, the profile sleeve 3 is pushed into the free end of the outer shaft part 4 with its second open end region 9 at the front. The profile sleeve 3 slides, in this case, into the inner profile of the outer shaft part 2 until the free end of the outer shaft part 4 arrives in the first end region 7 of the profile sleeve 3 and an end face 110 of the outer shaft part 4 knocks against the radially outwardly inwardly projecting collar 8 of the profile sleeve 3 in the one axial direction (=slip-on direction). The collar 8 serves here therefore as a stop 8 to delimit the movement of the profile sleeve 3 in the one axial direction 6 when the profile sleeve 3 is inserted into the outer shaft part 4.

The profile sleeve 3 is not yet secured, however, in the other axial direction 6, namely in opposition to the slip-on direction, so that it could easily be removed again from the outer shaft part 4. A projection 13 of the outer shaft part 4, which is arranged in an end region 120 of the outer shaft part 4, which also includes the free end, and projects radially inwardly and lies against the profile sleeve 3 in the axial direction 6 which is opposite to the slip-on direction, is provided for the fixing in the other axial direction 6. The projection 13 is arranged offset inwardly by a few millimeters in relation to the end face 110 of the outer shaft part 4.

Figure 10:
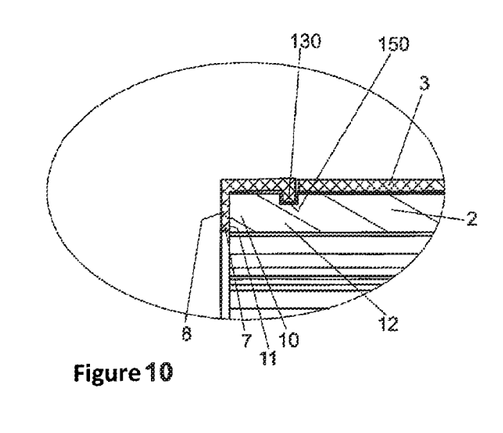
FIG. 10 is a sectional view of an enlarged part region of a further alternative embodiment of the inner shaft part with a profile sleeve with a projection for fixing the profile sleeve on the inner shaft part.

FIG. 10 shows an enlarged part region of a further alternative embodiment of the inner shaft part 2 with the profile sleeve 3 with a projection 130 for fixing the profile sleeve 3 on the inner shaft part 2. The inner shaft part 2 comprises an opening 150 in which the projection 130 of the profile sleeve engages and for the abutment of the profile sleeve 3 against the inner shaft part 2 in the opposite axial direction 6. The projection 130 and the profile sleeve 3 are realized in a preferred manner as a one-part integral component, the projection 130 being realized as a spring-elastic catch which snaps radially into the opening 150 of the inner shaft part 2. The profile sleeve 3 is provided in a first end region 7 with a radially inwardly projecting collar 8 which is realized as a stop and prevents the free passage of the inner shaft part 2. At assembly, the profile sleeve 3 is slipped over the free end 10 of the inner shaft part 2 with its second open end region 9 at the front. The profile sleeve 3 slides, in this case, over the outer profile of the inner shaft part 2 until the free end 10 of the inner shaft part 2 arrives in the first end region 7 of the profile sleeve 3 and an end face 11 of the inner shaft part 2 knocks against the radially inwardly projecting collar 8 of the profile sleeve 3 in the one axial direction 6. The collar 8 serves here therefore as a stop 8 to delimit the movement of the profile sleeve 3 in the one axial direction 6 when the profile sleeve 3 is slipped onto the inner shaft part 2.

The invention consequently provides a simple and cost-efficiently producible fixing of the profile sleeve 3 on the inner shaft part 2 or in the outer shaft part 4, in addition greater production tolerances of the profile sleeve 3 being tolerable.

The invention claimed is:

1. A longitudinally adjustable steering shaft for a motor vehicle, comprising:
   an outer shaft part,
   an inner shaft part which is received coaxially in the outer shaft part so as to be displaceable along an axis of the steering shaft,
   the two outer and inner shaft parts including profiles that interlock in cross section for transmitting a torque,
   a profile sleeve arranged between the inner shaft part and the outer shaft part, the profile sleeve comprising a first end region with a radially protruding stop configured to abut against an end face of the inner shaft part or of the outer shaft part in a first direction along the axis, and
   a radial projection disposed on or at an end region of the outer shaft part or the inner shaft part and configured to abut against the profile sleeve in an opposite direction along the axis.

2. The steering shaft of claim 1, wherein the profile sleeve comprises a slot in the first end region which is open axially and into which the radial projection projects.

3. The steering shaft of claim 2, wherein the profile sleeve is provided with a relief opening axially next to the inner end of the slot.

4. The steering shaft of claim 1, wherein the radial projection is formed of material throw-up of the inner shaft part or of the outer shaft part.

5. The steering shaft of claim 4, wherein the radial projection is introduced as caulking axially proceeding from the end face.

6. The steering shaft of claim 1, wherein the radially protruding stop is a circumferential collar of the profile sleeve.

7. A longitudinally adjustable steering shaft for a motor vehicle, comprising:
   an outer shaft part;
   an inner shaft part which is received coaxially in the outer shaft part so as to be displaceable along an axis of the steering shaft;
   the two outer and inner shaft parts including profiles that interlock in cross section for transmitting a torque;
   a profile sleeve arranged between the inner shaft part and the outer shaft part, the profile sleeve comprising a first end region with a radially protruding stop configured to abut against an end face of the inner shaft part or of the outer shaft part in a first direction along the axis, the profile sleeve further comprising a slot; and
   a radial projection disposed on or at an end region of the outer shaft part or the inner shaft part, wherein the radial projection is disposed in the slot and abuts against the profile sleeve in an opposite direction along the axis.

8. The longitudinally adjustable steering shaft of claim 7 comprising a cardan joint disposed on the inner shaft and a cardan joint disposed on the outer shaft.

9. The longitudinally adjustable steering shaft of claim 7 wherein the profile sleeve is comprised of plastic.

10. The longitudinally adjustable steering shaft of claim 7 wherein the radial projection is a caulking.

11. The longitudinally adjustable steering shaft of claim 7 wherein the radial projection protrudes radially outward from the inner shaft part, wherein a region of an interior of the inner shaft part radially inward of a location where the radial projection is disposed is free of any deformation associated with the radial projection.

12. The longitudinally adjustable steering shaft of claim 7 wherein the profile sleeve includes a relief opening adjacent to the slot.

13. The longitudinally adjustable steering shaft of claim 7 wherein the radial projection is disposed three millimeters from an axial end face of the outer shaft part or the inner shaft part.

* * * * *